United States Patent
Zhou

(10) Patent No.: US 10,462,085 B2
(45) Date of Patent: Oct. 29, 2019

(54) MESSAGE DISTRIBUTION GROUPS

(71) Applicant: COMCAST CABLE COMMUNICATIONS, LLC, Philadelphia, PA (US)

(72) Inventor: Tong Zhou, Lower Gwynedd, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 14/165,143

(22) Filed: Jan. 27, 2014

(65) Prior Publication Data

US 2015/0215241 A1 Jul. 30, 2015

(51) Int. Cl.
*H04L 12/58* (2006.01)
(52) U.S. Cl.
CPC ............ *H04L 51/16* (2013.01); *H04L 51/14* (2013.01)
(58) Field of Classification Search
None
See application file for complete search history.

(56) References Cited

U.S. PATENT DOCUMENTS

| | | | | |
|---|---|---|---|---|
| 5,864,684 A * | 1/1999 | Nielsen | ............... | G06Q 10/107 709/206 |
| 7,801,284 B1 * | 9/2010 | Chakra | ............. | H04M 1/274525 379/88.03 |
| 8,028,031 B2 * | 9/2011 | Colvin | ............... | G06Q 10/107 709/206 |
| 8,516,052 B2 * | 8/2013 | Fu | ..................... | H04L 12/1818 709/205 |
| 8,844,010 B2 * | 9/2014 | Brady | ................ | G06Q 10/107 709/206 |
| 2004/0088359 A1 * | 5/2004 | Simpson | ............ | G06Q 10/107 709/206 |
| 2006/0075040 A1 * | 4/2006 | Chmaytelli | .......... | G06Q 10/107 709/206 |
| 2007/0005713 A1 * | 1/2007 | LeVasseur | ............ | H04L 63/306 709/206 |
| 2008/0294730 A1 * | 11/2008 | Oral | ..................... | G06Q 10/107 709/206 |
| 2009/0013087 A1 * | 1/2009 | Lorch | ............... | H04M 1/72552 709/232 |
| 2013/0191467 A1 * | 7/2013 | Dernavich | ............. | H04L 51/12 709/206 |

(Continued)

OTHER PUBLICATIONS

Marcus Klein, "Managing Distribution Lists in Exchange Server 2010," MSExchange.org, dated Mar. 23, 2010, 4 pages.

(Continued)

*Primary Examiner* — Lance Leonard Barry
*Assistant Examiner* — Mohammad Yousuf A. Mian
(74) *Attorney, Agent, or Firm* — Banner & Witcoff, Ltd.

(57) ABSTRACT

A user who is a member of a message distribution group may wish to be temporarily removed from receiving all future messages sent to a distribution group or from receiving select future messages sent to a distribution group. The user can send a request to temporarily leave the distribution group and provide criteria or conditions which would cause the user to be automatically rejoined to the distribution group for receiving future messages. A user can also request to receive messages sent to the distribution group during the user's temporary absence from the distribution group upon rejoining the distribution group.

30 Claims, 11 Drawing Sheets

(56) References Cited

U.S. PATENT DOCUMENTS

2013/0232206 A1* 9/2013 Hopper ............... G06Q 10/107
709/206

OTHER PUBLICATIONS

Dynamic Distribution Groups, Microsoft Corporation, dated Sep. 8, 2010, 1 page.
"How to Leave an Optional Email Distribution List," Kenyon College, Oct. 10, 2013, 1 page.

* cited by examiner

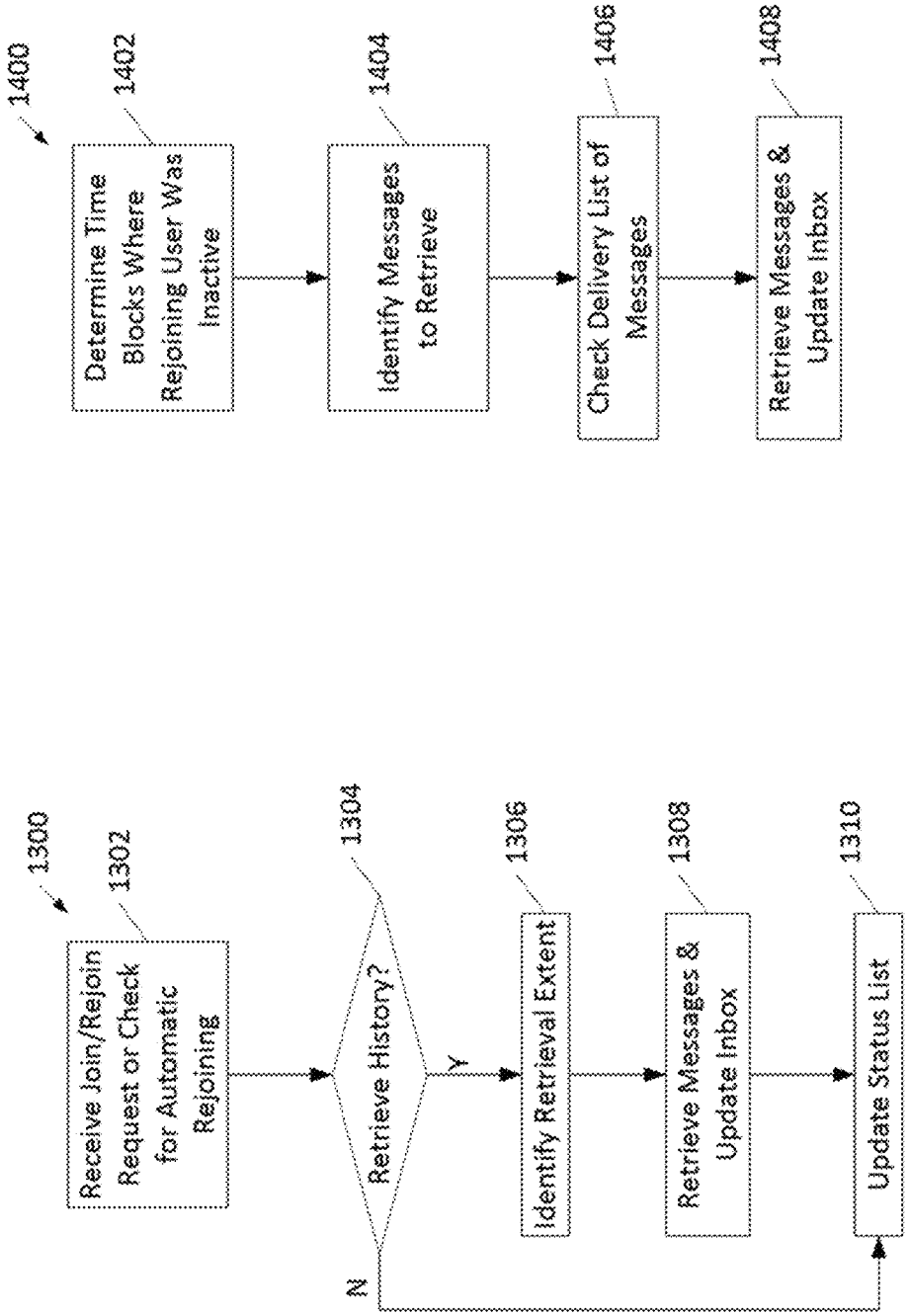

To: AllManagers@techcompany.com
From: Tom Meier
Subject: RE: Meeting
Sent: Monday, December 2, 2013 11:25 AM

| Name / 1902 | Status / 1904 | Deactivate/Reactivate Condition / 1906 | Delivery Status / 1908 |
|---|---|---|---|
| Ann Adams | Inactive | At 5pm on December 10, 2013 | Not Delivered |
| Bob Cook | Active | None | Delivered |
| Charles Chambers | Inactive | Keyword in Subject | Not Delivered |
| David Crawford | Active | Fridays at 6pm/Mondays at 6am | Delivered |
| Carole Cheshire | Active | None | Delivered |
| Sam Foster | Active | None | Delivered |
| Tom Meier | Active | None | Delivered |
| John Morgan | Active | None | Delivered |
| Brady Smith | Active | None | Delivered |
| Alice Wood | Active | None | Delivered |

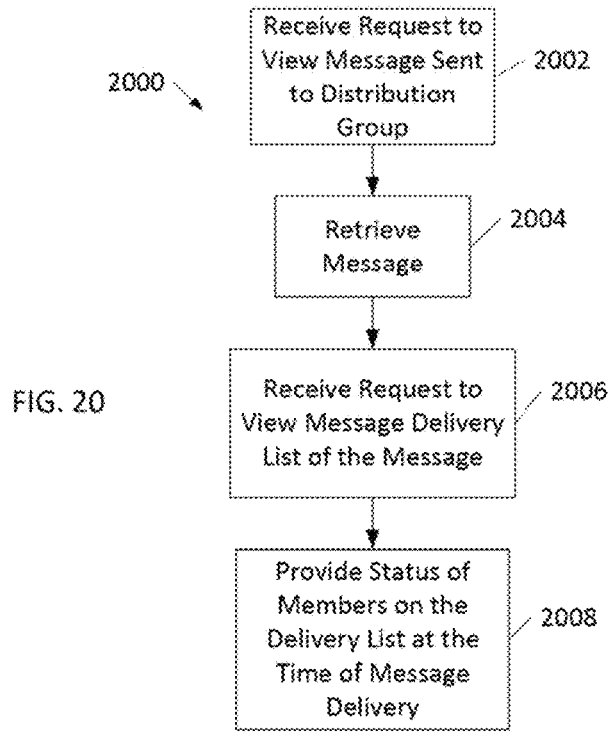

FIG. 20

MESSAGE DISTRIBUTION GROUPS

BACKGROUND

Message distribution groups, such as electronic mail (email) distribution groups, allow messages to be sent to a wide range of recipients with minimal effort. However, the needs and interests of a distribution group's members can change over time, and there is an ever-present need for easier ways to manage the messaging that takes place within distribution groups.

SUMMARY

The following summary is for illustrative purposes only, and is not intended to limit or constrain the detailed description.

Features herein relate to an approach to managing distribution groups for messages, such as electronic mail (email), text and instant, electronic chats, and other messages. In some embodiments, a message recipient may view a message that was sent to a distribution group, and may be given an option in the message view to leave the distribution group. The option may be in the form a single button press, or the option may include additional configuration options, such as establishment of one or more rejoin criteria that will cause the recipient to be automatically rejoined to the distribution group for receiving future messages. For example, the user may indicate that he/she wishes to no longer receive future messages in this group until 5 pm, but that after 5 pm, the user may resume receiving future messages sent to the distribution group. Such a user may be temporarily removed from the distribution group, for purposes of receiving future messages addressed to the group (e.g., the user's address may still be retained in the distribution group's list, but with an indication that messages are not to be delivered).

In some embodiments, the leaving and rejoining of the user from/to the distribution group may be done on a message thread basis. A message thread may be a grouping of related messages having one original message, and a series of one or more replies to the original message (or subsequent replies). The user may indicate that they wish to leave the distribution group for a first thread, but remain in the distribution group for other future messages or threads.

In another aspect, the message distribution system may automatically rejoin the user to the distribution group when the one or more rejoin criteria are satisfied. Messages sent to the group after rejoining will be delivered to the user's inbox as per normal operation. The user may also have the option of retrieving messages that were sent to the group while the user was temporarily removed from the group. For example, after 5 pm in the example above, the user may wish to then receive all of the messages that were sent to the group. Alternatively, the user may wish to simply receive the latest message in a thread.

A user who has temporarily left a distribution group may be given an option, such as in their message inbox, to rejoin groups that they have left. Senders of messages addressed to the group may be given information indicating what members received, and did not receive, their message, and may also be given information indicating conditions under which some members will be rejoined to the group (e.g., "Joe will rejoin this group after 5 pm").

The summary provides some examples and is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIG. 13 shows an exemplary method for rejoining a distribution group.

FIG. 14 shows an example of a method for determining missed messages to retrieve.

FIG. 19 illustrates an example of a message delivery summary screen for a distribution group.

FIG. 20 shows an example of a method for viewing a distribution group delivery list.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
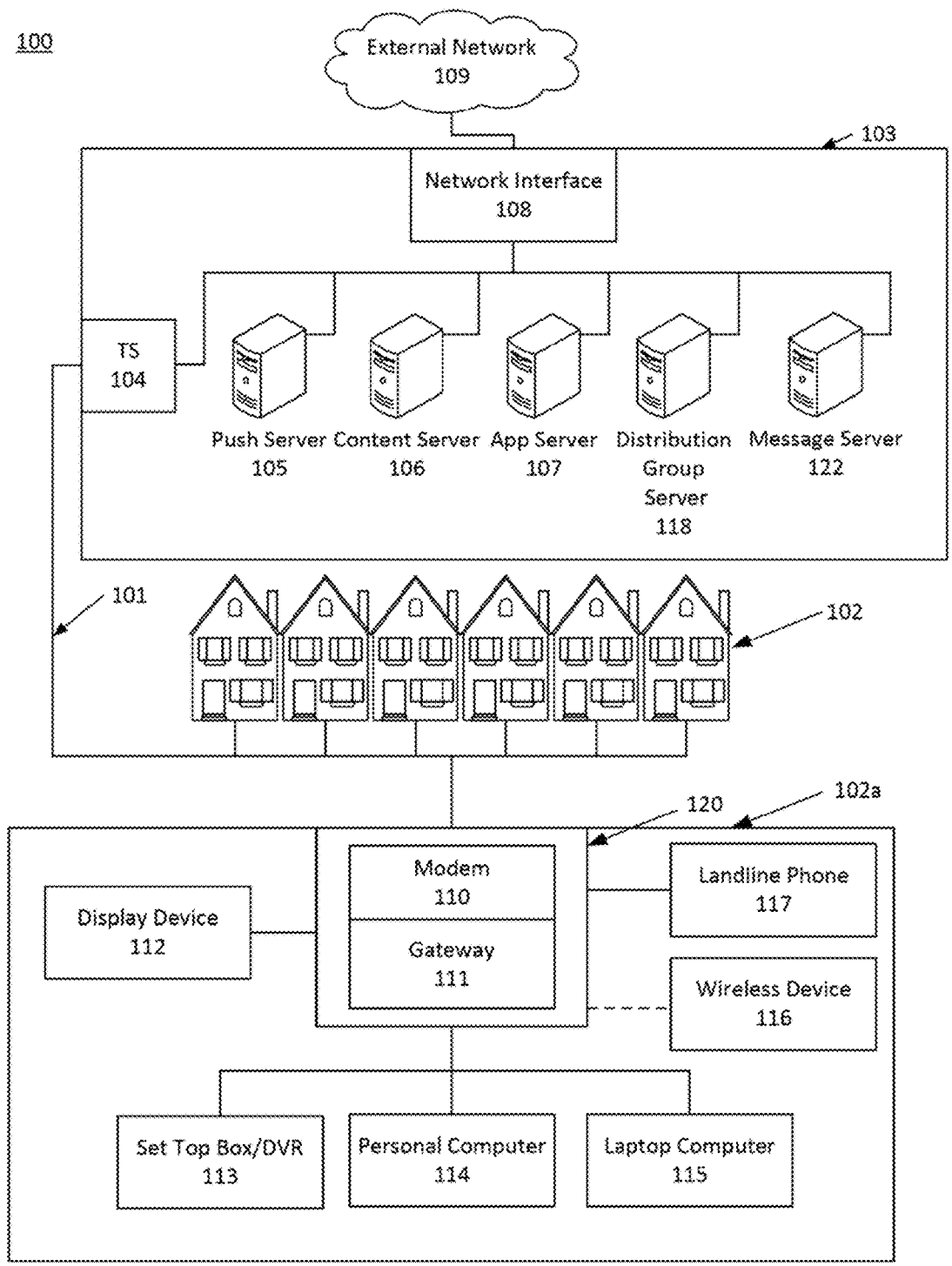
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone-DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
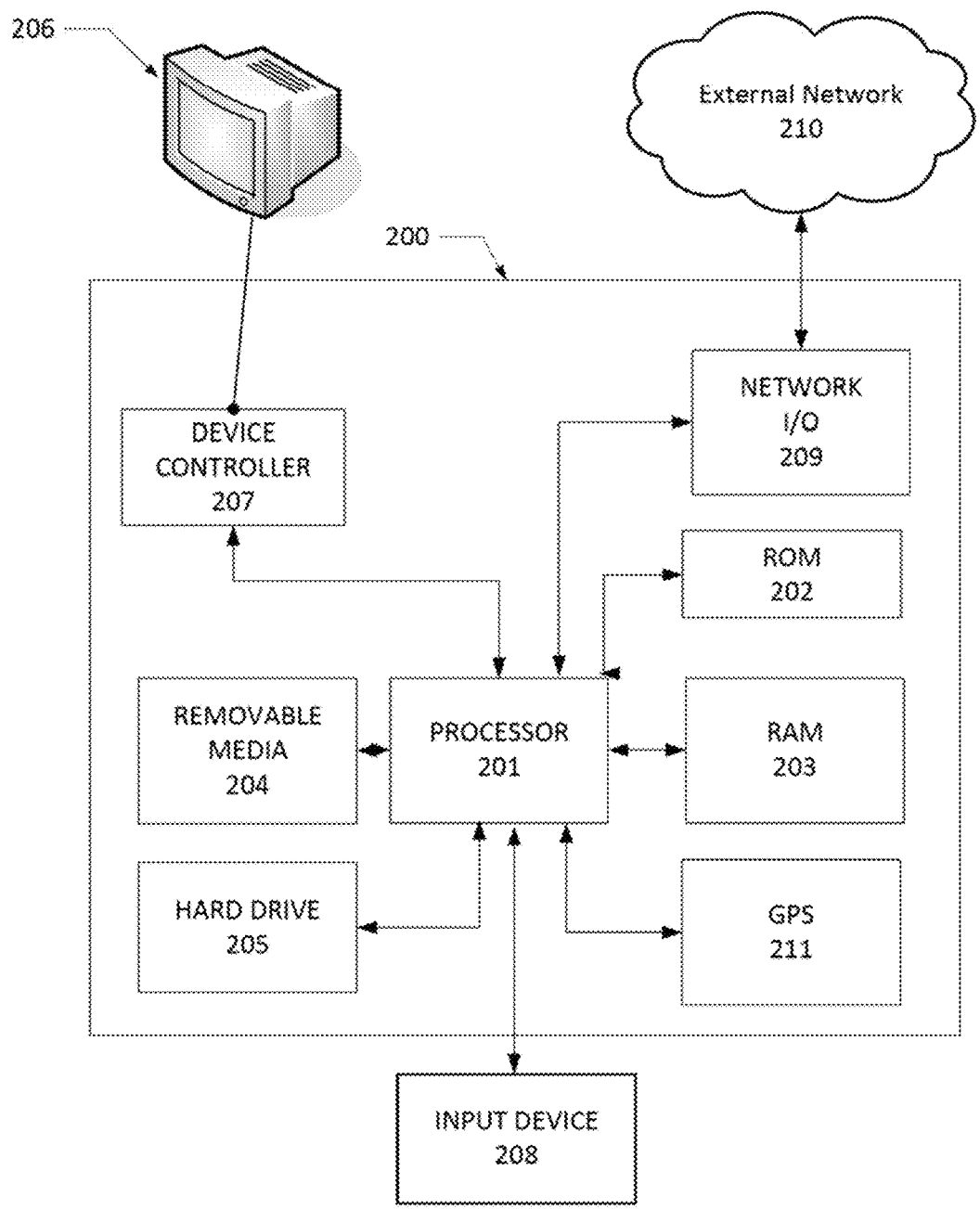
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

The communication network 100 of FIG. 1 may include a server (i.e., distribution group server 118) or system of servers (i.e., distribution group server 118 and message server 122) that supports a distribution group in which a user may be temporarily removed from the distribution group and later receive messages which were sent to the group while the user was not a member of the distribution group. For example, the system may consider a user who is temporarily removed or unsubscribed as an inactive member of the distribution group in contrast to a user who is permanently removed or unsubscribed. A user who is subscribed to messages of a distribution group may receive or be informed of a link or particular account or address to which a request to leave the distribution group is to be directed. Once temporarily or permanently removed from the group, the user no longer receives future messages (i.e. messages received by the server after the user has been removed) which are directed to the distribution group. In some aspects, the user may be provided with the option to rejoin the distribution group. The user may have various options with regard to later receiving missed messages which were sent to the distribution group when the user was temporarily unsubscribed. With respect to temporarily unsubscribing and later receiving missed messages, the user may specify whether to be temporarily unsubscribed from particular threads or from all threads and whether to receive missed messages for particular threads or for all threads. The user may access the messages through an interface, for example, an e-mail client operating on a user's computing device such as personal computer 114, laptop computer 115, and wireless device 116.

The distribution group system may include a distribution group server 118 which may store messages sent to the distribution group in a memory of the distribution group server and manage, store, and maintain membership and associated member preferences for the distribution groups. According to another aspect, another server can store the messages sent to the distribution group such as message or e-mail server 122, and the distribution group server 118 can communicate with the message server 122. The messages may be e-mail messages and may be stored using various formats including Mbox, Maildir, MIX, or any other message storage format or protocol. The distribution group server 118 and message server 122 may also be located in external network 109.

The system may maintain, organize, and store the distribution group membership and delivery information in a variety of data storage forms including but not limited to data in a database, memory, files, lists, and tables. For example, the system may store membership lists including status information, subscription information, and rejoin conditions for each distribution group associated with the system. Upon receiving a message directed to a distribution group, the system may reference the membership list to determine to which members of the distribution group the incoming message should be delivered. Delivery of a message to a member may include placing a copy of the message in the member's inbox and/or notifying the member of the arrival of a new message in the member's message or e-mail account. Since the member may be subscribed to only certain threads, the system may maintain and store corresponding delivery lists for each thread including lists to reference for delivery of new incoming messages and lists storing which members received each message (i.e. members to which the message was delivered). According to another aspect, the system may reference the membership status list to determine which users are currently unsubscribed from all messages and determine which users are subscribed to all messages. The system can then determine to which thread, if any, the messages belong and identify the members who are subscribed to that particular thread. The various aspects of the disclosure will be discussed in more detail herein with respect to the illustrative figures.

Creating a Distribution Group

Figures 3, 4:
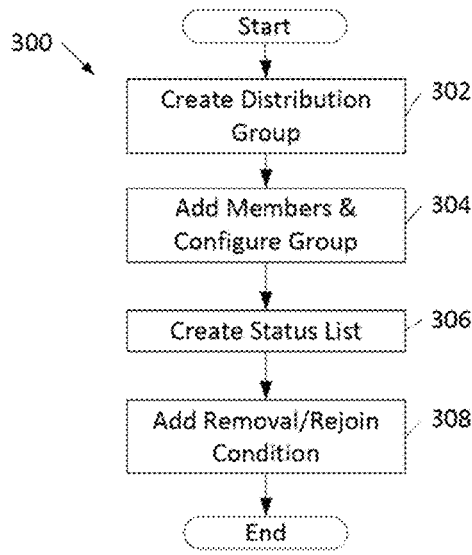
FIG. 3 illustrates a flowchart of an exemplary method of creating a distribution group according to some aspects of the disclosure.
FIG. 4 illustrates an example of a distribution group configuration screen.

FIG. 3 illustrates an exemplary method of creating a distribution group 300 according to some aspects of the disclosure. At step 302, an administrator or user may create a distribution group containing members where messages sent to a single distribution group account are delivered to individual members of the distribution group (e.g., email inboxes). For example, a distribution group account may be in the form of an e-mail address (or other identifiers such as phone numbers, device addresses, user names, etc.) where a single e-mail sent to the distribution account is delivered to individual e-mail accounts of the subscribed users while the e-mail sent to the individual e-mail accounts is addressed to the distribution account. During an initial distribution group configuration, a user may select other users, e.g., members or subscribers to add to the distribution group, for example, by adding the members' individual email addresses or accounts at step 304. At step 306, the system or a computing device such as a server may generate a membership list for the distribution group and associate a status with each member or subscriber of the distribution group and store the membership list with the associated status of each member. The status may indicate the type of membership that the member has such as whether the member is an active member, an inactive member, or whether the member has different statuses for different threads. When the distribution group is created, each member may have a default status such as active for all threads. The membership list may be used by the message server as a message delivery list for members with an active status. At step 308, the user may include conditions that may automatically cause a member's status to be changed. For example, in response to certain conditions being met, a member may be removed from the distribution group, or rejoined to a distribution group. The member may be automatically changed to inactive in the distribution group or be removed from the distribution group by the server without further input or direction from the member in response to the occurrence of a deactivation condition similar to rejoining the member to the distribution group in response to meeting rejoining criteria of the user. The various available statuses are described further below.

FIG. 4 illustrates an example of a distribution group configuration screen 400. From the distribution group configuration screen 400, an administrator or member of the group can manage the membership of the distribution group. The screen includes examples of different statuses 402 that may be associated with members 404 of the group 406. For example, a member or user 404 may be designated as "active" when the user 404 is subscribed to all messages sent to the group 406 and receives all messages sent to the distribution group. A member may be designated as "inactive" in the system or server in response to a request from the member to be temporarily or permanently removed or unsubscribed from the group. An inactive member may subsequently be manually or automatically rejoined to the distribution group, if certain rejoin criteria are met. Alternatively, the member can indicate a desire to permanently leave or unsubscribe from the group, in which case the member may be removed from the group and information associated with the member such as configuration settings, preferences, and message history may be deleted from the system. As a default setting, the system may treat all requests to leave a group as a temporary removal from the group. Alternatively, the default setting may be to treat all requests to leave as a permanent removal.

For a temporarily removed member, future messages directed to the distribution group are not shown in and may be hidden from the inactive member's inbox. For example, future messages may not be placed in the member's inbox folder or file on a server upon receipt of the message by the system. The system may continue monitoring and tracking messages which are sent to the group during the period that the member is designated as inactive such that should the member rejoin or re-subscribe to the distribution group, the messages which the member missed or did not receive while designated as inactive may still be delivered to the rejoined member. The system may store data, for example, in the membership status list of the distribution group indicating the member's status as inactive. The system may record the date and time each time the member's status is changed.

For example, the server may organize each member's messages into folders. For a member that has specified rejoin criteria, the server may create a hidden missed messages folder associated with the member or the member's account of incoming messages which are to be delivered upon the member becoming an active member. A hidden folder may be a folder which is not normally accessible to the member and is not presented as a folder in the member's account that can be used by the member. The hidden folder may be accessible in special circumstances such as when the member requests to view the member's missed messages.

To deliver the missed messages to the reactivated member's inbox, the server may copy or move the files from the member's missed messages folder to the member's inbox folder, and the delivered missed messages may be marked as new messages. A flag or signal may be transmitted to a mail client on a member's computing device indicating that a new message has arrived in the member's inbox. A push mechanism such as a simple mail transfer protocol (SMTP) may be used to indicate that the member has received new messages. In another aspect, a pull mechanism may be used where the mail client periodically polls the message server for new messages or sends a request to the message server for new messages. The pull mechanism may be implemented, for example, according to the Internet message access protocol (IMAP) or post office protocol (POP3).

According to another aspect, the server may create a file associated with an inactive member containing the content of all the missed messages which are to be delivered upon the inactive member becoming an active member. The file may be a hidden file. In another aspect, the server may add a flag or other data in metadata associated with the message for members to which later delivery of the message may be requested (e.g., when the member rejoins the distribution group). The server may store and maintain an index file of messages flagged for each member. Upon the member rejoining the distribution group (i.e., becoming an active member), the server may search for flags associated with the member or reference the index file to determine which previously sent messages to retrieve for delivery to the inbox of the now active member.

A member or user may be designated as "removed" or "unsubscribed" in the system or server to indicate that the member is fully or permanently removed or unsubscribed from the distribution group such that the member does not receive any future messages sent to the distribution group. A member who requests to be permanently unsubscribed may also be deleted from the distribution group, for example, from the membership list or file such that the removed member does not appear on the configuration screen 400 under membership management. A member who was permanently unsubscribed may be treated as a new member if the member later decides to rejoin the distribution group. In response to a member being permanently removed from the distribution group, members of the distribution group may receive a message or notification informing the members of the member who has been fully removed from the distribution group.

A member may be designated as "removed" or "unsubscribed" in response to an explicit request to be completely or permanently removed or unsubscribed from the distribution group. For example, the member may select an option indicating complete or permanent removal from the distribution group. A member may also be designated as "removed" or "unsubscribed" or deleted from the message delivery lists if the member has been designated as "inactive" for a predetermined period of time. For example, the system may periodically determine how long a member has been inactive by comparing the time and date on which the member became inactive with the current date and time. If the length of time that the member has been continuously inactive is greater than a threshold period such as two years, the member may be permanently deleted from the distribution group by completely removing or deleting the membership from the membership group lists. A message may be sent to the member shortly before the permanent removal to provide the member with a chance to prevent the permanent deletion by enabling the member to request a reset of the inactive time period or request to rejoin the distribution group.

The member's status may reflect a status for all messages sent to the distribution group. Alternatively, a member may have different statuses for different message threads in the distribution group. A thread subscription indicator 408 may be provided, for example, with a member's status if the member elects not to receive messages for particular message threads. For example, an asterisk 408 next to "Active" may be used to indicate that the corresponding member is unsubscribed from particular threads as shown in FIG. 4. If a member has different statuses for different message threads, the membership status list may include this information as a flag in a partial subscription field.

To determine threads for delivery for each active member, the system may maintain and store individual delivery lists for each thread and reference the message delivery list of a thread when a message belonging to the thread is received. In the message delivery list, the system may store status information of each member with respect to the particular thread or store the members who are active for the particular thread in the delivery list of the thread. The system may maintain and store a subscription list for each member indicating the threads to which the member is subscribed or if the member is subscribed to all threads. The member subscription list may identify threads by a thread identifier and can be referenced by the system when the system is determines to which members an incoming message is to be delivered.

A member added during the initial configuration of the distribution group may have a default status of "active" indicating that all messages sent to the distribution group are sent to the active member. On the configuration screen 400, a user may specify automatic rejoin conditions and/or unsubscribe/deactivation conditions 418. In response to the occurrence of the specified conditions, the user may be temporarily unsubscribed, rejoined, or permanently unsubscribed from the distribution group depending on the preferences associated with the conditions. For example, a member whose current status is inactive may have rejoin criteria which specifies that the member be rejoined (e.g., changed to active status) to the distribution group at a particular time and/or on a particular day. As another example, a member may request that membership be deactivated or to be permanently removed from the distribution group in response to a condition such as a keyword in the subject line or body of the message, in response to a message from a particular member, or a particular date, day, and/or time, etc. In response to the occurrence of the condition, the system may automatically delete the member from the distribution group data. A member's status in a distribution group may be changed in response to any number of conditions and combinations of conditions which will be described in more detail.

The screen 400 also shows various distribution group management options in addition to the membership management option 410 discussed above such as thread tracking 412, group administrator management and settings 414, and a distribution group delivery summary 416. FIG. 4 shows these options in the form of a "thread tracking" tab, a "group administrator" tab, and a message "delivery summary" tab.

With respect to thread tracking, enabling the thread tracking feature 412 of the distribution group can cause a computing device or server to store, track, and/or maintain all messages sent to the distribution group account including relationships between each message to enable the server to track and organize the messages into threads. A message thread may be a grouping of related messages. For example, these messages may be related by being a reply to an earlier message or a forward of an earlier message or may otherwise contain content or a quote from an earlier message. The thread tracking feature will be described in more detail with respect to the thread identifiers.

A group administrator feature 414 can enable administrators of the group to designate which users have the privilege to change the configuration and settings of the distribution group. A delivery summary 416 feature can provide a user with a listing of messages sent to the distribution group and show which members received each message. The delivery summary 416 will be described in more detail with respect to FIG. 19.

Leaving a Distribution Group

Figure 5:
FIG. 5 shows an example of a message to a distribution group.

FIG. 5 shows an example of a message 500 to the distribution group viewed by a member of the distribution group. As mentioned above, a distribution group member may choose to discontinue receiving messages addressed to the distribution group. The member may request removal from the distribution group by selecting an option to leave the group such as the button 502. The leave group selectable option may also be included in a footer of the e-mail in the form of a selectable link such as a hyperlink, a link to automatically generate a leave group message, or a link to an unsubscribe account associated with the distribution group.

The leave group message may be a request to leave the group that is transmitted to the system from the user's computing device.

The message 500 may include a variety of options such as new email, delete, reply, reply all, forward, leave group, and view recipients. The leave group and view recipients options may be presented on the display for the user's selection in response to determining that the message is addressed to a distribution group.

Figure 6:
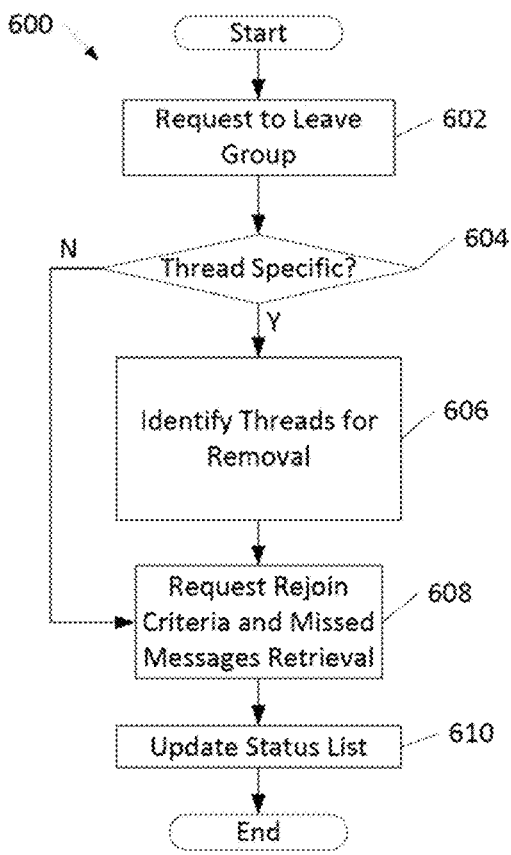
FIG. 6 illustrates a flowchart of an exemplary method of unsubscribing a user from a distribution group.

FIG. 6 illustrates a flowchart of an exemplary method of processing an unsubscribe request. As described above, the user may be presented with a selectable option to leave the distribution group. At step 602, the user's computing device may generate a request to leave the corresponding distribution group and send the request to a distribution group server 118 or system of servers (118, 120) in response to receiving a user selection of the leave group option. The leave group option may default to temporarily removing the user from the distribution group. An option can also be provided to allow the user to permanently leave the group.

A prompt, which may be generated by the system or the computing device, may appear on the user's computing device requesting that the member select whether to unsubscribe from specific threads or to unsubscribe or discontinue receiving all future messages in response to the user selecting a leave group request. The user may select an option to indicate whether to unsubscribe the user from specific threads or from all threads and messages directed to the distribution group. If the user selects the option to be unsubscribed from certain threads at step 604, the system or device may prompt the user to identify threads for removal at step 606. If the system or device determines that the leave request is for specific threads at 604, the system may proceed to step 606 where the user is prompted to identify the threads from which the user is to be unsubscribed or leave. The user may be provided with a list of the threads in the distribution group (e.g., a list of message threads that have been sent to the distribution group) and the user is requested to select one or more of the listed threads. The prompt for thread removal may be in the form of a thread removal screen which will be described in more detail with respect to FIG. 10. The user may also be provided with threads which have recent messages (i.e. active threads) or which have messages within a particular timeframe so that inactive discussion threads are hidden. The system can set a timeframe where threads for which a message has not been received by the system within a predetermined period of time are considered inactive. The system can determine inactive threads by comparing the most recent message in the thread with the predetermined period of time and if the message does not fall within the predetermined period of time, the thread is considered to be inactive. If the message does fall within the predetermined period of time the thread is an active thread. The system can filter out the inactive threads and present the active threads on the thread removal screen of FIG. 10.

The user may be requested to provide rejoin criteria or conditions where the user is to be automatically rejoined to the distribution group when the criteria or conditions are met. The criteria may be thread specific or may be applicable to rejoining the distribution group by re-subscribing to all threads.

At step 608, the user may be prompted to select or provide criteria or conditions, if any, for causing the user to be automatically rejoined to the distribution group. The rejoin criteria or conditions may include rejoining on a specific day and/or at a specific time, in response to detecting a keyword in the message, or in response to a particular sender. The user may be prompted for the criteria or conditions in response to selecting the leave group option. The prompt may be in the form of a criteria or conditions selection screen, and the criteria and/or conditions may be included with the leave group request transmitted to the server. At step 610, the system may update the member's status in the distribution group status list by changing the member's status depending on whether the member requested to be unsubscribed from all threads or particular threads and whether there are any rejoin criteria associated with the member and threads. For example, if the member is being temporarily unsubscribed from all threads, the member's status in the membership list can be changed to and stored as inactive. If the member is being temporarily unsubscribed from certain threads, the member can be deleted from the stored delivery list for the threads from which the member is being temporarily unsubscribed.

Figures 7, 8:
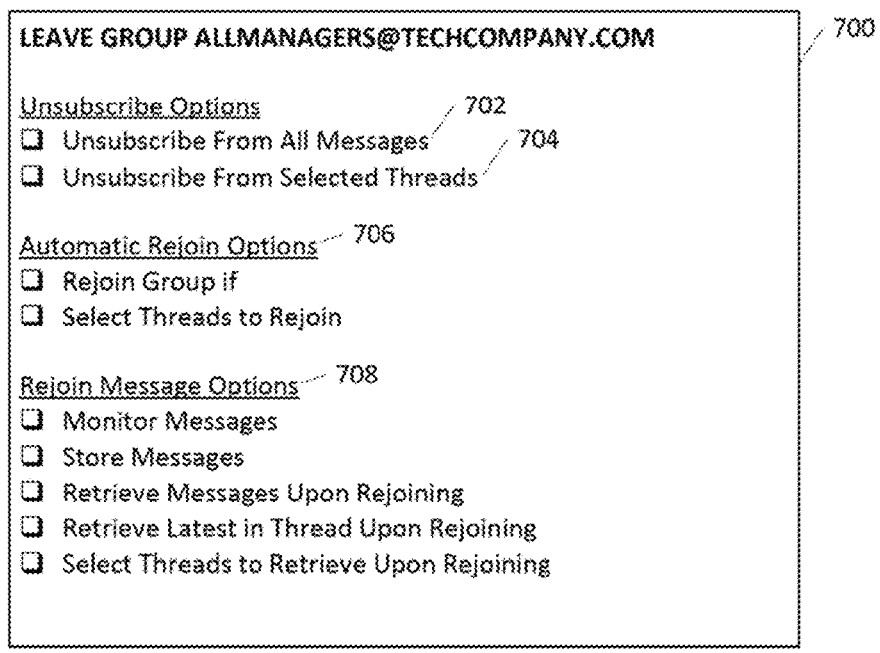
FIG. 7 shows an example of a screen for selecting unsubscribe options.
FIG. 8 shows an example of a screen showing messages sent to a distribution group.

FIG. 7 shows an example of options that the user may select with the leave request to temporarily unsubscribe from a distribution group in step 602. The user may be permanently removed from the distribution group or designated as inactive with no automatic rejoin conditions if no rejoin options are selected. For example, the user may be provided with a number of unsubscribe options. The user may choose to unsubscribe from all messages 702 sent to the distribution group so that the user receives no further or future messages directed to the distribution group account. Another option 704 is to unsubscribe from certain threads which may be selected by the user and will be described in more detail with respect to FIGS. 8-10.

The user may also be provided with automatic rejoin options 706. The automatic rejoining options may be in the form of conditions or criteria which may cause the system to automatically rejoin the user to the distribution group. For example, the user may specify that the user be rejoined to the distribution group if certain conditions occur or criteria are met. The user may wish to be rejoined if certain keywords appear in the message or if the message is from a particular sender. The user may also want to be rejoined at a specific date and/or time. The user may request to be rejoined if content in a message is directed to the user. For example, the system may determine that if the user's name appears in the body of the message or if the user's name appears in a sentence ending in a question mark that the message contains content directed to the user. The user can also specify that the user automatically rejoin specific threads using a screen similar to the example shown in FIG. 10. The user can select the threads to which the user would like to rejoin, and in response to the selection, system will add the member to the stored delivery list for the particular threads. As will be discussed further below, the email system may periodically check to see if members should be rejoined to one or more distribution groups or threads with respect to FIG. 13.

The user can select rejoin preferences 708 or preferences for delivery of messages which were sent to the distribution group while the user was inactive or unsubscribed in step 608. For example, the user may elect to have the system continue to monitor for missed messages which may be delivered to the user (i.e., delivered to the user's inbox) in the future and/or store these messages for future delivery. The user may have all messages which were sent while the user was inactive retrieved and delivered to the user upon rejoining the distribution group. The user may further specify to retrieve the latest thread upon rejoining or select threads to retrieve upon rejoining which will be described with respect to FIG. 11. For example, the user may indicate a preference to receive messages missed from particular threads or conversations, messages missed during a particular timeframe, messages from the latest thread, and/or all messages sent while the user was considered inactive upon rejoining the distribution group.

FIG. 8 shows an example of a screen 800 showing messages sent to the distribution group "AllManagers." The messages may be organized by thread and message. For example, the distribution group server or message server may assign a thread-message identifier 802 to each message to enable tracking of the thread to which each message belongs. The thread identifier 802 may be, for example, a combination of alphanumeric values with the first value identifying the thread and the second value identifying the message of the thread. In the example of FIG. 8, the first message regarding "New Work" from Tom is assigned a thread identifier of "110" and since the message from Tom is the first message, a second value of "1" is included in the Thread ID to indicate that the message from Tom is the first message of the thread. The second message of the thread in which Bob replies to Tom's message is similarly identified as "110-2."

According to another aspect, the identifiers may be included in fields in metadata such as a header of the message. The header may be, for example, an Internet header of an e-mail message. The metadata may include fields such as fields for a message identifier, a thread identifier, and previous message identifier. The identifiers may be unique alphanumeric identifiers. As will be described with respect to FIG. 12, the system can identify messages starting a new thread and assign a thread identifier to the message. Any number of identification conventions may be used and the identification convention shown in FIG. 8 is merely an example for illustrative purposes.

Figure 9:
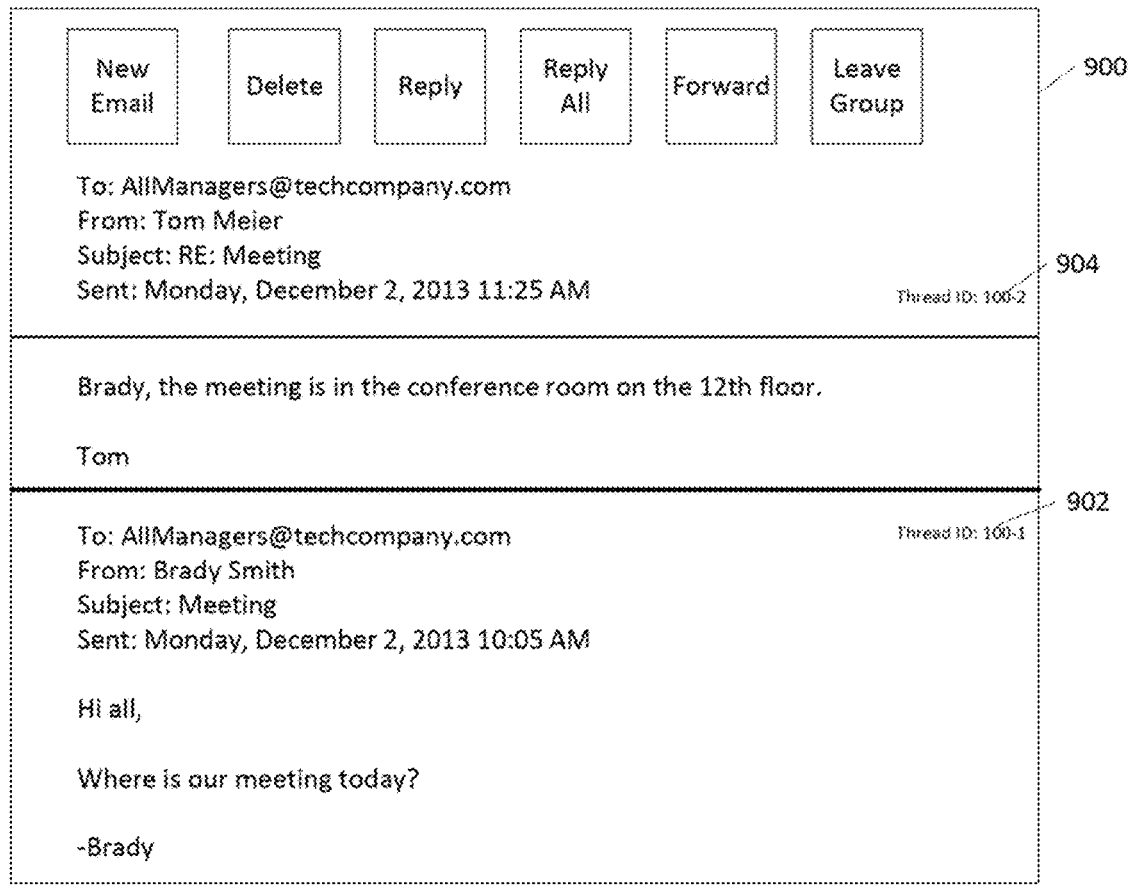
FIG. 9 shows an example of a message including thread identifiers.

FIG. 9 shows an example of a message 900 including thread identifiers 902 for the first message of the thread and a thread identifier 904 for a message replying to the first message. The thread identifier 902 may be included in the body of the message, or the thread identifier 904 can be added as an extra field in the header of the message or inserted into the subject line of the message with special characters such as quotes or brackets to separate the thread identifier 902 from the content of the subject line. According to another aspect, the thread identifier may be included in metadata or the Internet header portion of the message which is not explicitly shown to the reader.

Figure 10:
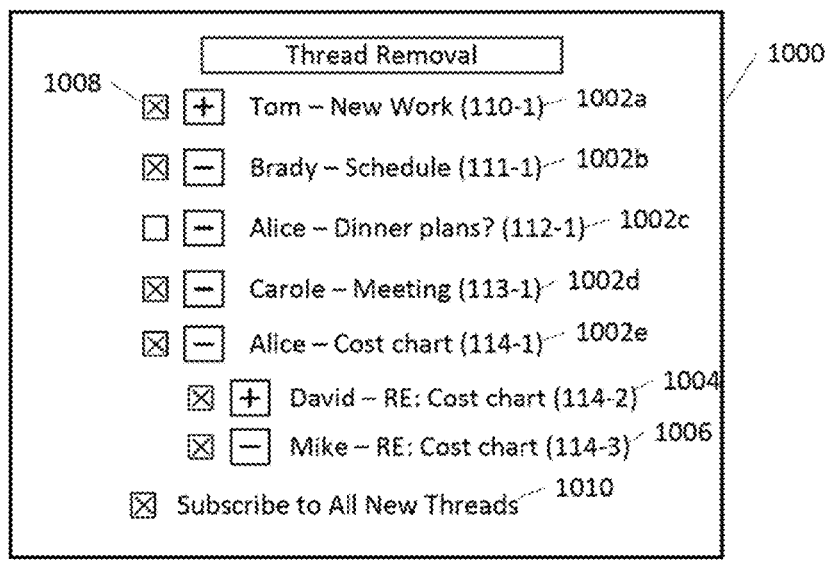
FIG. 10 shows an example of a screen or presentation window for thread removal.

FIG. 10 shows an example of a screen or presentation window 1000 which may be provided to the user to enable the user to select threads from which the user would like to be unsubscribed when the user identifies threads for removal in step 606. For the threads selected for removal, the user is deleted in the delivery list or is designated as inactive in the deliver list for the selected threads. The messages may be presented in a list organized by threads 1002a-e and sub-threads 1004. Sub-threads 1004 may be threads which branch off from messages within an existing thread. For example, sub-threads may be started when two different messages 114-2, 114-3 reply to or forward the same message 114-1. The system can determine that a thread includes sub-threads when more than one message in the thread includes a previous message's identifier in the message's previous message identifier field. For example, the messages 114-2 and 114-3 each identify message 114-1 as its previous message.

The list may also provide the user with hierarchy information to enable the user to quickly ascertain the relationships between each message in the thread where a message lower in the hierarchy is a reply or forward of a first message. For example, FIG. 10 shows subsequent messages of each thread as indented under the first message of the thread. The messages may also be organized by topic in addition to or instead of by more direct message relationships such as replies and forwards. On the screen 1000, the user can choose thread selectors 1008 for threads from which the user is requesting to be unsubscribed. An option may also be provided to enable the user to select whether the user is to be subscribed or unsubscribed from all new threads 1010.

Figure 11:
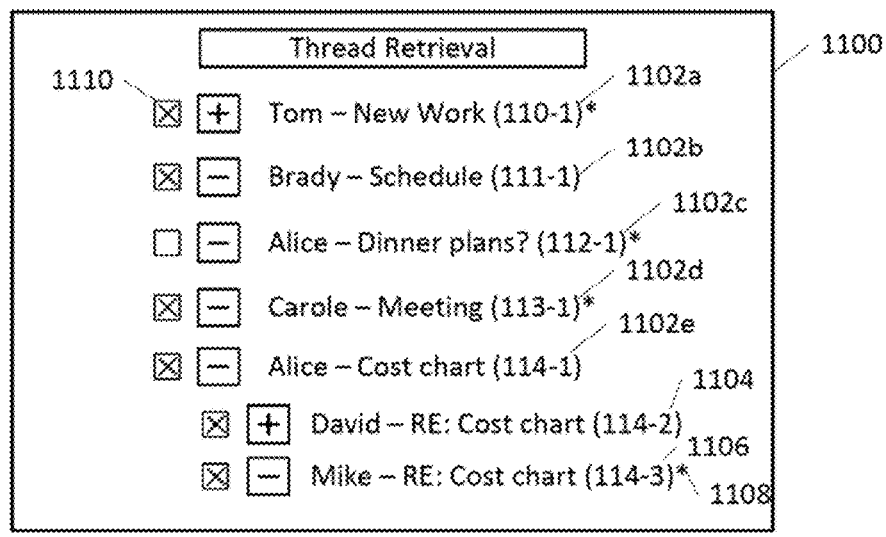
FIG. 11 shows an exemplary thread retrieval screen.

FIG. 11 shows an exemplary thread retrieval screen 1200 enabling the user to select messages from certain threads to retrieve. The thread retrieval screen 1200 may be presented in step 608 when the user selects threads to retrieve for missed messages. The thread retrieval screen may also be presented to the user when the user rejoins the group to indicate which threads to retrieve for missed messages as will be discussed with respect to FIG. 13. Similar to the thread removal screen 1000, the thread retrieval screen 1200 may present the messages in a hierarchical list organized by threads 1202. The screen 1200 may present all messages and indicate which of the messages were missed by the rejoined user using a missed message indicator 1208. The user can use the thread retrieval screen 1100 to select which previously sent messages the user would like to receive upon rejoining the distribution group. A message selection option 1110 may be provided for each message and/or thread. By selecting a message selection option 1110 of the first message of a thread, the user may elect to receive all messages in the selected thread. The user can also select individual messages to receive by choosing message selection options 1110 associated with individual messages. The retrieved messages may be sent to the user's inbox in the form of separate messages or in a single email. The system may also automatically send all missed messages to the user upon the user rejoining the distribution group. The system can provide a user with the option to receive multiple messages from a single thread in the form of one message incorporating the previous messages which may be replies and forwards of messages in the thread to reduce the number of messages received for missed messages. For example, the system may send the latest message which includes previous replies and/or forwards to messages in the thread in place of sending individual messages to the user for each message. Using the example of the messages and threads in FIG. 8, since the message identified as 114-2 is a reply to message 114-1, message 114-2 may already incorporate the text of message 114-1 in the content portion of message 114-2. Message 114-2-1 may be a reply to message 114-2 and may include the text of message 114-2 as well as 114-1. In receiving message 114-2-1, the user in effect also receives the content of messages 114-1 and 114-2 such that the user may find the delivery of the individual messages 114-1 and 114-2 to be redundant or superfluous. In this manner, the actual number of messages that need to be delivered is reduced which reduces the number of messages in the user's inbox as well as the load on the server.

Figure 12:
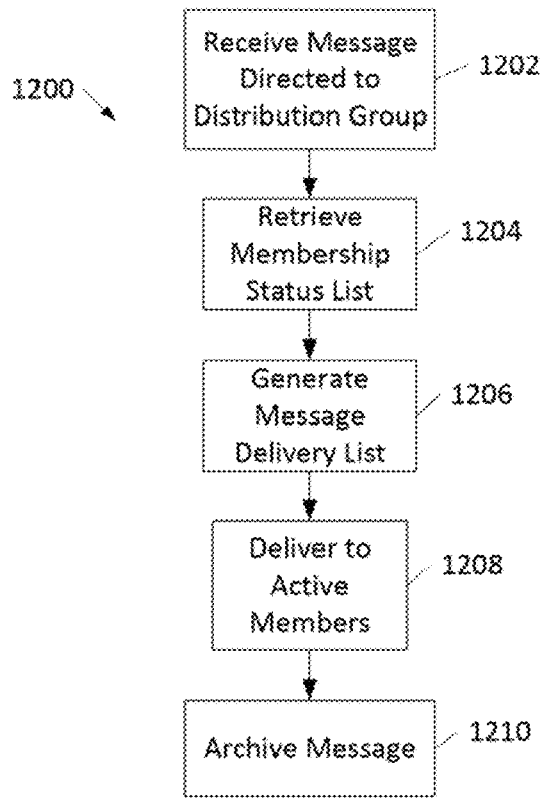
FIG. 12 shows an example of a method for processing a message directed to a distribution group.

FIG. 12 shows a flowchart of an example of a method of processing a message directed to a distribution group. At step 1202, the server can receive a message directed to an account or email address for the distribution group, assign a thread identifier and message identifier, and record a time stamp of receipt of the message. A thread identifier can be assigned by determining if the message belongs to an existing thread by determining whether the incoming message has a previous message identifier. If the incoming message does not have a previous message identifier, the system determines that the message is the beginning of a new thread and generates and assigns the message a thread identifier and a message identifier. The server can retrieve a membership list which includes the membership statuses and rejoin conditions as shown in FIG. 4 at step 1204 and determine to which users the message should be sent or delivered. For example, the system can reference the membership status list to determine which users are active for all threads and for the thread identifier of the incoming message. At step 1206, the server can generate a message delivery list for the message by including members who active for all threads and active for the particular thread of the message. At step 1208, the message may be delivered to individual inboxes or accounts of members based on the message delivery list. At step 1210, the message may be archived. For example, the message may be archived by storing the message and the delivery list of the message including the statuses of the members and any rejoin conditions of the members at the time that the message was delivered into a message history of the distribution group. The message or reference to the message may also be stored at this time in a record of messages to be delivered to a user upon the user's rejoining of the distribution group by adding the message to a missed messages index or by copying the message into a missed messages file or folder. The missed messages index may store information identifying the message and location where the message is stored.

Joining/Rejoining a Distribution Group

FIG. 13 shows a flowchart of an exemplary method of rejoining a distribution group 1300. As described herein, a user may be manually or automatically rejoined to a group by a server or other computing device in response to various conditions, or rejoined in response to a request sent by a user at step 1302. For example, in response to the request from the user or the occurrence of a rejoining condition for the user, a user may be added to the distribution group by changing the status of the user to active and recording and storing the date and time at which the user's status was changed. A new or unlisted user may also be added as a member in response to a request from the user. For inactive members, the server can periodically check for conditions which would cause a user to be rejoined to the distribution group. For example, the server can check for rejoining conditions for members of the distribution group at particular intervals such as every 24 hours or at set times each day (e.g., 3 AM). The server can also check for rejoining conditions (e.g., time of day, content of responses from other users, keyword in the subject, question directed to a user, etc.) before a message is delivered for group members and change the status of users to active for users who have satisfied rejoining conditions. In response to rejoining the distribution group, the rejoined user may have the option to receive all of the messages, select messages, or a summary of messages transmitted to the distribution group while the user was unsubscribed. At step 1304, the server or system may determine whether to retrieve for the user requesting to be rejoined to the group based on the rejoining user's preferences. As discussed previously herein, a user may indicate in rejoining preferences that upon rejoining the distribution group, the user is to be delivered messages that the user missed such as those messages that were not delivered to the user while the user was temporarily unsubscribed from or designated as inactive in the distribution group. The user can be prompted when the user temporarily unsubscribes from the distribution group to input whether missed messages should be sent to the user. The user may also be prompted for missed messages preferences upon requesting to rejoin the distribution group since new threads may have been started while the user was inactive. At the time of rejoining, the user can determine whether to retrieve messages from the new threads as part of the user's missed messages using thread retrieval as in step 608. If the server determines that the user did not select the option to receive missed messages upon rejoining the distribution group, the method may proceed to step 1310 and update the membership status list to indicate that the user's status is now "active" for the group and/or thread (depending on the rejoin) and record the date and time that the user's status was changed.

If, in step 1304, it is determined that the rejoin preferences indicated that missed messages were to be retrieved in response to a member rejoining the distribution group, the server determines the extent to which messages should be retrieved for delivery to the rejoining user as the rejoining user's missed messages at step 1306. The server may retrieve the appropriate message history of the distribution group for the user in response to receiving the user's rejoin request. The server may track and/or later determine which messages were sent to or received by the distribution group while the user's status was inactive. For example, the server may determine as each message is sent to or received by the distribution group or in the message archival process whether to associate the message with missed messages for a user. The missed messages may be messages which were not transmitted to the unsubscribed user at the time the messages were processed for delivery to the active distribution group members. As another example, in response to an indication that the user is rejoining the distribution group, the server may determine which messages were missed by the user based on the time the user was temporarily removed and the time the message was sent or received by referencing the user's missed messages data. In this example, the messages a user missed may be those received after the user's status was changed to inactive and before the user's status was changed back to active. The user can also have the option of requesting missed messages at a later point in time than the time the user rejoined the distribution group or requests to be rejoined to the group. For example, the server may receive a request for missed messages from a user who has already rejoined the distribution group. Based on the times that the user temporarily left the distribution group and rejoined the distribution group, the server can determine which messages were missed by the user and send those missed messages to the user.

FIG. 14 illustrates a flowchart of an example of a method of determining missed messages to retrieve 1400. At step 1402, the system can identify time blocks where the user was inactive. For example, the system can record the day and time at which a user's status was changed to inactive or active. By identifying the day and time at which a user's status was changed to inactive and the day and time of the next time the user's status is changed to active, the system can determine a start time and end time for a block of time where the user was inactive. At step 1404, the system can identify which messages are missed messages by comparing the time that messages were received or processed for delivery and the time block where the user was inactive. The system can compare the date and time that a message was received or processed with the start and end times of the user's inactive time period. Specifically, a message which has a received time stamp after the start time and before the end time of inactive time period may be considered a missed message. Using the start and end times of the user's inactive period, the system can search for messages which were received during that time period. At step 1406, the system can also check the delivery list maintained for each message to confirm that the user did not receive the message. At step 1408, the system can retrieve the missed messages for the user from the memory and send them to the user's inbox, for example, by copying the missed messages to the user's inbox. The system can also process the missed messages into a single message by combining the content of all of the missed messages into a single message for example as shown in FIG. 15.

Figure 15:
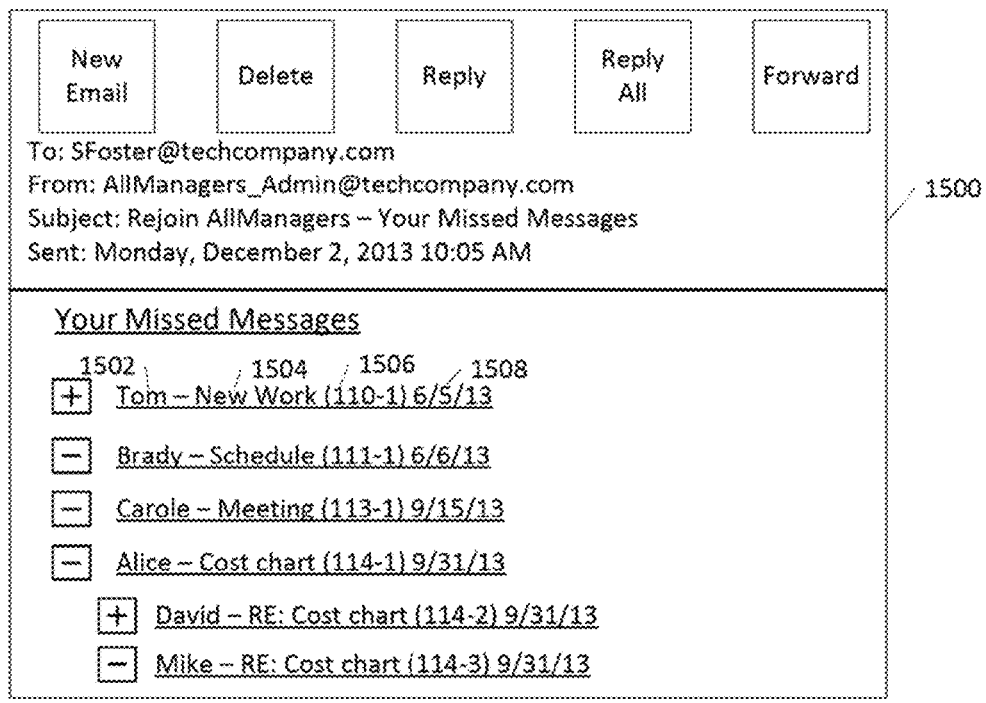
FIG. 15 illustrates an example of a message which may be sent to a user including messages or threads which were received during the user's absence from the distribution group.

FIG. 15 illustrates an example of a message 1500 which may be sent to the user including messages or threads which were received during the user's temporary absence from the distribution group and selected for retrieval upon the user's rejoining of the distribution group. The messages may be presented in a collapsible/expandable organized list according to threads. The messages may include sender information 1502, subject information 1504, thread identifiers 1506, and/or date and/or time sent or received 1508. The retrieved messages may also be presented as selectable links which when selected by the user cause the selected message and/or thread to be delivered to the user's inbox or to present the selected message to the user in a new message window.

Managing Group Memberships

Figure 16:
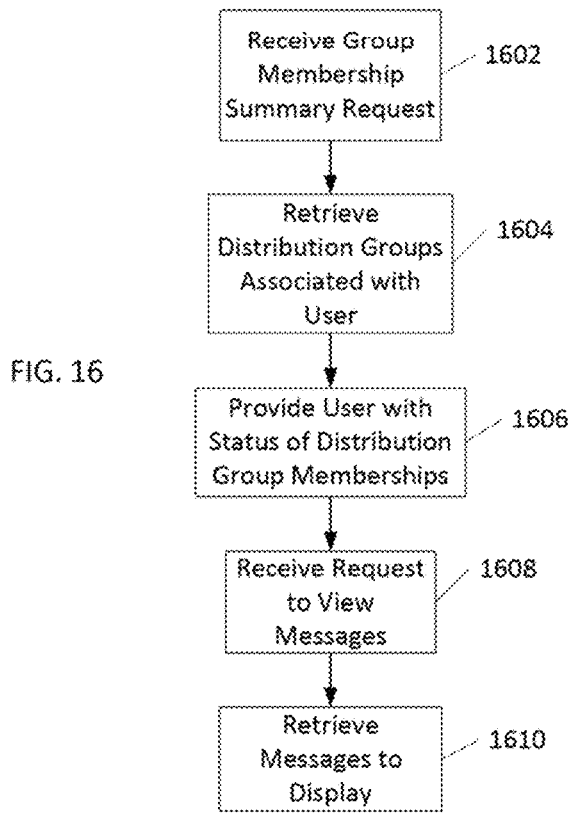
FIG. 16 shows an example of a method enabling a user to manage the user's groups.

FIG. 16 shows a flowchart of an example of a method enabling a user to manage the user's membership groups. At step 1602, the system or server may receive a request from a user to deliver a summary of the user's membership in distribution groups. At step 1604, the server may retrieve the distribution groups associated with user such as those in which the user is an active member or was an active member (i.e., inactive member or removed member). At step 1606, the server may provide the user with information about the user's group memberships including, for example, the groups in which the user is a member or was a member, the status of the user's memberships, any rejoin conditions, and any active threads. An active thread may be thread in which a message belonging to the thread has been received within a certain predetermined time period. For example, an active thread may be a thread in which a message belonging to the thread has been received according to the time stamp within three days of a request from the user (e.g., request for membership summary).

The information related to the user's status of distribution group memberships may be transmitted from the server to the user's computing device. In addition to information relating to the user's memberships, the user can select certain items of information to view additional information associated with the selected item and/or view more details of the selected item. For example, the user can select a group and have the options of rejoining the group, changing rejoin and/or unsubscribe conditions, and managing active thread subscriptions for threads in the group using methods and screens as described herein. At step 1608, the user can select a distribution group and view all messages directed to the distribution group which the server can receive in the form of a request to view messages of a distribution group. The user may also view all messages of a distribution group in which the user is inactive. At step 1610, the server can retrieve all or a subset of messages directed to the selected distribution group or groups and display the messages to the user. The messages of the distribution group may be displayed in various forms including in a hierarchical format organized by thread as described herein.

Figure 17:
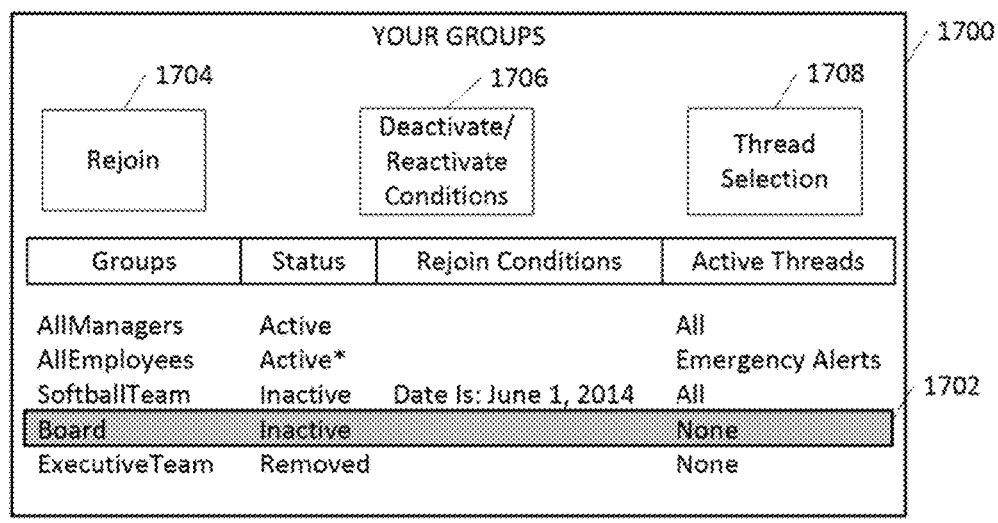
FIG. 17 illustrates an exemplary distribution group summary screen.

FIG. 17 illustrates an exemplary distribution group summary screen 1700 which provides a user with information about the user's distribution group memberships. In the example shown in FIG. 17, the group "Board" is selected in which the user is an inactive member. The user is provided with a Rejoin option 1704, a Rejoin conditions option 1706, and a thread selection option 1708. The user can select the Rejoin option 1704 and rejoin the selected distribution group, for example, as described herein with respect to FIG. 13. The user can select the Rejoin conditions option 1506 to select the conditions which would automatically cause the user to be rejoined to the selected distribution group, for example, as described herein with respect to FIG. 7.

Figure 18:
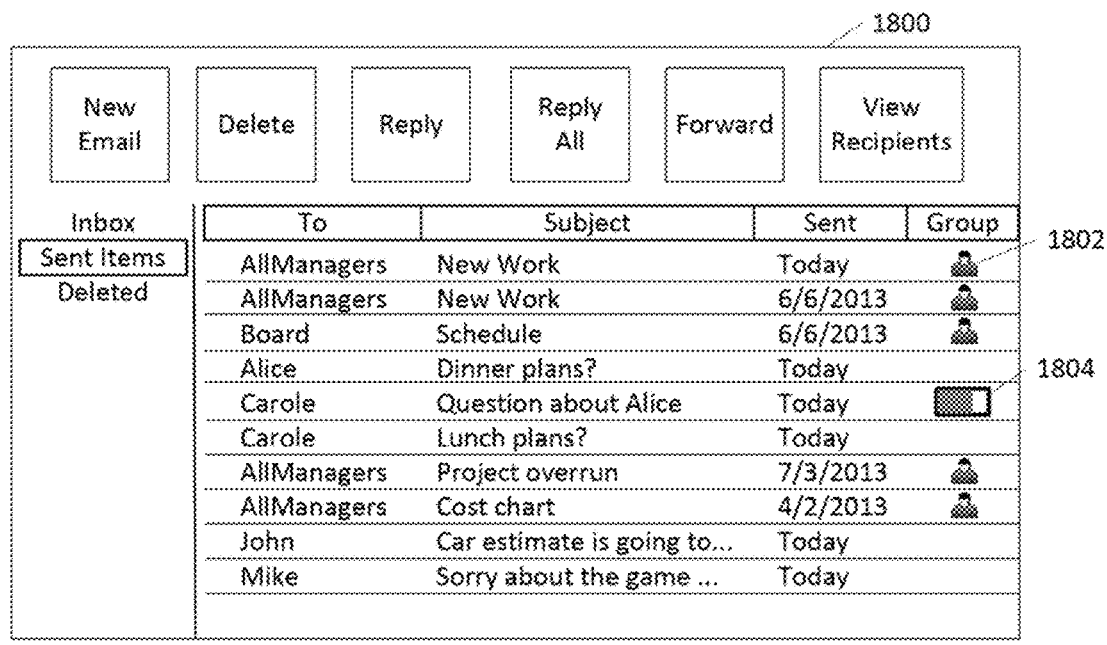
FIG. 18 shows an example of a sent messages screen.

FIG. 18 shows an example of a sent messages screen 1800 which enables a user to determine which members have received messages sent to a distribution group. The screen 1800 may provide information related to messages sent to a distribution group. For example, the screen 1800 may include a selectable icon 1802 which when selected provides information of which users received the particular message and for members who were inactive at the time the message was sent, the information may include whether there is a possibility that members may receive the message in the future. For example, the information may include rejoin conditions of members. The information about which users received the particular message may also be in the form of a percentage indicator 1804. The system can calculate the percentage of members who were active according to the message's delivery list and provide the percentage or a graphical icon indicating the percentage for example a bar 1804.

FIG. 19 illustrates an example of a delivery summary screen 1900 including information regarding which members of the distribution group received a particular message. The information may be retrieved from a stored message delivery list of each message sent to the distribution group combined with information from the membership status list. A user may select a message and be provided with information regarding which members of the distribution group received the selected message. The screen includes the names of members of the distribution group 1902 and the status of each member 1904 as well as any conditions 1906 which may cause a member to be rejoined or unsubscribed from the distribution group. The screen can also include delivery status 1908 indicating whether the message was delivered to each member of the group or whether each member of the group received the message. The server can generate the delivery summary screen 1900 using the delivery data stored in the delivery lists for each message.

FIG. 20 provides a flowchart of an illustrative method of viewing a delivery list for a message 2000. At step 2002, the message server or system may receive a request to view a message sent to the distribution group from, for example, a user's computing device through a mail or message application. At step 2004, the message server or system may retrieve the message in response to the request and send the message information to the requesting device. The message information may indicate that the message was sent to a distribution group and include an option to view the delivery list associated with the message. At step 2006, the user's computing device may send a request to the server or system to view the message delivery list by retrieving the stored delivery list of the message in response to the user selecting the option to view the recipients of the message. At step 2008, in response to receiving the request to view recipients of the message, the message server or system may retrieve the delivery list associated with the message and transmit recipient information based on the delivery list to the user's device. The user's computing device may display the recipient information, for example, as shown in FIG. 19.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

I claim:

1. A method comprising:
   removing, by at least one computing device configured to serve a message distribution group, and based on a request from a user device associated with a user, the user from distribution in the message distribution group, such that one or more future messages addressed to the message distribution group are not sent to the user device;
   receiving, by the at least one computing device and from the user device, information indicating one or more words;
   receiving, by the at least one computing device and after the user was removed from distribution, a first message addressed to the message distribution group; and
   based on a determination that the first message comprises the one or more words, the at least one computing device:
      adding the user to distribution in the message distribution group; and
      delivering the first message to the user device.

2. The method of claim 1, further comprising:
   causing generation of a user interface indicating contents of a second message and comprising a selectable option to remove the user from distribution,
   wherein the second message is sent, to members of the message distribution group, before the user is removed from distribution, and
   wherein the removing the user from distribution is performed based on the user selecting the selectable option.

3. The method of claim 1, further comprising:
   after the adding the user to distribution, causing generation of a user interface comprising a selectable option for the user to retrieve one or more messages that were sent, to the message distribution group, during a period of time in which the user was removed from distribution.

4. The method of claim 1, further comprising:
   storing information indicating a plurality of members of the message distribution group; and
   storing information identifying a subset of the members of the message distribution group who are not to receive messages sent to the message distribution group.

5. The method of claim 1, further comprising:
   providing a sender of the first message with information indicating which members of the message distribution group did not receive the first message.

6. The method of claim 1, further comprising:
   wherein the removing the user from distribution comprises removing the user from distribution for receipt of one or more future messages addressed to the message distribution group and pertaining to a first discussion thread, while retaining the user in distribution for receipt of one or more future messages addressed to the message distribution group and pertaining to a second discussion thread different from the first discussion thread.

7. The method of claim 1, further comprising:
   receiving a request to indicate members in the message distribution group; and
   after receiving the request to indicate the members in the message distribution group, generating an indication of the members in the message distribution group, the indication comprising an indication that one or more of the members are currently removed from distribution in the message distribution group.

8. The method of claim 1, further comprising:
   sending a message to members of the message distribution group, the message indicating the removing of the user from distribution in the message distribution group.

9. The method of claim 1, wherein the removing the user from distribution in the message distribution group comprises changing a status of the user to an inactive status in the message distribution group.

10. The method of claim 1, wherein the removing the user from distribution in the message distribution group comprises removing the user from a membership list of the message distribution group.

11. The method of claim 1, wherein the one or more words comprises a name of the user.

12. The method of claim 1, wherein the adding the user to distribution in the message distribution group comprises adding the user to distribution of a thread comprising the first message.

13. A method comprising:
   removing, by at least one computing device configured to serve a message distribution group, a user from distribution in the message distribution group, such that one or more future messages addressed to the message distribution group are not sent to a user device associated with the user;
   receiving, by the at least one computing device and after the user was removed from distribution, a first message addressed to the message distribution group; and
   based on a determination that the first message comprises a question containing a name of the user, the at least one computing device:
   adding the user to distribution in the message distribution group; and
   delivering the first message to the user device.

14. The method of claim 13, further comprising:
   causing generation of a user interface indicating contents of a second message and comprising a selectable option to remove the user from distribution,
   wherein the second message is sent, to members of the message distribution group, before the user is removed from distribution, and
   wherein the removing the user from distribution is performed based on the user selecting the selectable option.

15. The method of claim 13, further comprising:
   after the adding the user to distribution, causing generation of a user interface comprising a selectable option for the user to retrieve one or more messages that were sent, to the message distribution group, during a period of time in which the user was removed from distribution.

16. The method of claim 13, further comprising:
wherein the removing the user from distribution comprises removing the user from distribution for receipt of one or more future messages addressed to the message distribution group and pertaining to a first discussion thread, while retaining the user in distribution for receipt of one or more future messages addressed to the message distribution group and pertaining to a second discussion thread different from the first discussion thread.

17. The method of claim 13, further comprising:
receiving a request to indicate members in the message distribution group; and
after receiving the request to indicate the members in the message distribution group, generating an indication of the members in the message distribution group, the indication comprising an indication that one or more of the members are currently removed from distribution in the message distribution group.

18. The method of claim 13, further comprising:
sending a message to members of the message distribution group, the message indicating the removing of the user from distribution in the message distribution group.

19. The method of claim 13, wherein the removing the user from distribution in the message distribution group comprises changing a status of the user to an inactive status in the message distribution group.

20. The method of claim 13, wherein the removing the user from distribution in the message distribution group comprises removing the user from a membership list of the message distribution group.

21. The method of claim 13, wherein the adding the user to distribution in the message distribution group comprises adding the user to distribution of a thread comprising the first message.

22. A system comprising:
a computing device configured to serve a message distribution group; and
a user device associated with a user,
wherein the computing device is configured to:
remove the user from distribution in the message distribution group, such that one or more future messages addressed to the message distribution group are not sent to the user device;
receive, from the user device, information indicating one or more words;
receive, after the user was removed from distribution, a first message addressed to the message distribution group; and
based on a determination that the first message comprises the one or more words:
add the user to distribution in the message distribution group; and
deliver the first message to the user device,
wherein the user device is configured to receive the first message.

23. The system of claim 22, wherein the computing device is configured to remove the user from distribution in the message distribution group by changing a status of the user to an inactive status in the message distribution group.

24. The system of claim 22, wherein the computing device is configured to remove the user from distribution in the message distribution group by removing the user from a membership list of the message distribution group.

25. The system of claim 22, wherein the one or more words comprises a name of the user.

26. The system of claim 22, wherein the computing device is configured to add the user to distribution in the message distribution group by adding the user to distribution of a thread comprising the first message.

27. A system comprising:
a computing device configured to serve a message distribution group; and
a user device associated with a user and configured to send a request to the computing device,
wherein the computing device is configured to:
remove, based on the request, the user from distribution in the message distribution group, such that one or more future messages addressed to the message distribution group are not sent to the user device;
receive, after the user was removed from distribution, a first message addressed to the message distribution group; and
based on a determination that the first message comprises a question containing a name of the user:
add the user to distribution in the message distribution group; and
deliver the first message to the user device.

28. The system of claim 27, wherein the computing device is configured to remove the user from distribution in the message distribution group by changing a status of the user to an inactive status in the message distribution group.

29. The system of claim 27, wherein the computing device is configured to remove the user from distribution in the message distribution group by removing the user from a membership list of the message distribution group.

30. The system of claim 27, wherein the computing device is configured to add the user to distribution in the message distribution group by adding the user to distribution of a thread comprising the first message.

* * * * *